US012651325B1

(12) United States Patent
Dale et al.

(10) Patent No.: US 12,651,325 B1
(45) Date of Patent: Jun. 9, 2026

(54) DEEP LEARNING-BASED AUTOFOCUS IMPROVEMENT METRIC FOR SYNTHETIC APERTURE SONAR AND SYNTHETIC APERTURE RADAR

(71) Applicant: United States of America as represented by the Secretary of the Navy, Arlington, VA (US)

(72) Inventors: Jeffrey J Dale, Lynn Haven, FL (US); Matthew S Emigh, Panama City Beach, FL (US); James L Prater, Jr., Lynn Haven, FL (US)

(73) Assignee: The United States of America as represented by the Secretary of the Navy

( * ) Notice: Subject to any disclaimer, the term of this patent is extended or adjusted under 35 U.S.C. 154(b) by 275 days.

(21) Appl. No.: 18/598,710

(22) Filed: Mar. 7, 2024

(51) Int. Cl.
*G06K 9/00* (2022.01)
*G06T 7/00* (2017.01)

(52) U.S. Cl.
CPC .. *G06T 7/0002* (2013.01); *G06T 2207/20081* (2013.01); *G06T 2207/20084* (2013.01)

(58) Field of Classification Search
CPC .... G06V 10/82; G06V 10/764; G06V 10/454; G06V 2201/03; G06V 10/774; G06V 10/25; G06V 40/193; G06V 10/44; G06V 10/993; G06V 40/18; G06V 20/56; G06V 10/462; G06V 20/41; G06V 20/46;
(Continued)

(56) References Cited

U.S. PATENT DOCUMENTS

| | | | | |
|---|---|---|---|---|
| 11,756,334 | B2 * | 9/2023 | Liu | G06F 18/214 |
| | | | | 382/156 |
| 2016/0379352 | A1 * | 12/2016 | Zhang | G06T 7/0002 |
| | | | | 382/157 |

(Continued)

OTHER PUBLICATIONS

Gerg, Isaac D., and Vishal Monga. "Real-time, deep synthetic aperture sonar (SAS) autofocus." 2021 IEEE International Geoscience and Remote Sensing Symposium IGARSS. IEEE, 2021. (Year: 2021).*

(Continued)

*Primary Examiner* — Hadi Akhavannik
(74) *Attorney, Agent, or Firm* — James M. Kasischke; Jeffry C. Severson

(57) ABSTRACT

A deep learning-based system and method for determining whether an autofocus algorithm has improved or degraded the image quality of a snippet derived from a synthetic aperture sonar system or a synthetic aperture radar system. The deep learning-based system and method embody a trained convolutional neural network that is configured to process a pair of snippets consisting of an unfocused snippet and a focused snippet. The focused snippet is produced by performing an autofocus algorithm on the unfocused snippet. The convolutional neural network processes the pair of snippets to determine if the autofocus algorithm has improved or degraded the image quality of the unfocused snippet. The convolutional neural network generates data that represents a confidence of improvement in image quality. The convolutional neural network leverages self-supervised learning and requires significantly fewer ground truth labels than a fully-supervised neural network.

5 Claims, 7 Drawing Sheets

(58) Field of Classification Search
CPC ...... G06V 10/776; G06V 40/14; G06V 10/50; G06V 10/758; G06V 20/52; G06V 10/267; G06V 10/761; G06V 10/26; G06V 2201/031; G06V 40/10; G06V 20/64; G06V 20/20; G06V 20/40; G06V 2201/07
See application file for complete search history.

(56) References Cited

U.S. PATENT DOCUMENTS

| | | | |
|---|---|---|---|
| 2022/0087642 A1* | 3/2022 | Wegner | G01S 15/8959 |
| 2023/0143374 A1* | 5/2023 | Rhodes | G06V 10/40 |
| | | | 382/103 |

OTHER PUBLICATIONS

Duersch, Michael I., and David G. Long. "Backprojection autofocus for synthetic aperture radar." (2013). (Year: 2013).*

* cited by examiner

100

115            116

117        118

130 122 140 120 148

Snippet 1
Snippet 2

132 142

ResNet-18
(Feature
Extractor)

144

Concatenate 146 147

Batch Norm
Linear
(1024→128)
ReLU

Batch Norm
Linear
(128→1)
Sigmoid

150

Output

200

Sample Snippets $S_1$ and $S_2$ From Dataset — 202

Estimate Phase Gradient $\varphi_2$ Of Snippet $S_2$ Using PGA — 204

Create Degraded Snippet $S'_1$ By Correcting Snippet $S_1$ With $\lambda\varphi_2$ — 206

Input Snippets $S_1$ and $S'_1$ Into Neural Network In Random Order — 208

To Block
210

DEEP LEARNING-BASED AUTOFOCUS IMPROVEMENT METRIC FOR SYNTHETIC APERTURE SONAR AND SYNTHETIC APERTURE RADAR

STATEMENT OF GOVERNMENT INTEREST

Cross Reference to Other Patent Applications

None.

Field of the Invention

The present disclosure relates to a deep learning-based autofocus improvement metric for synthetic aperture sonar and synthetic aperture radar.

BACKGROUND

In synthetic aperture sonar (SAS), uncompensated plat- form motion often leads to unfocused images. When images are highly unfocused, it is difficult to detect and identify objects on the seafloor, both for human operators and automated target recognition (ATR) algorithms. As a con- sequence, degradation of the detection rate of the ATR algorithms may occur as well as an increase in the time required for post-mission analysis. Automatic focus (auto- focus) algorithms are used in SAS imaging to improve image quality by refining beamformer parameters to com- pensate for discrepancies between the real world and model assumptions, such as in the position, trajectory, or orienta- tion of the collection vehicle or in underwater sound speed. In most cases, these autofocus algorithms are highly effec- tive at reducing perceived blur in generated SAS imagery. However, the autofocus algorithms occasionally degrade image quality rather than improve it. Such degradation in image quality commonly occurs when trying to focus only a small portion of the image (i.e., snippet), which is a typical preprocessing step in automated target recognition (ATR). In particular, iterative, metric-guided autofocus algorithms may suffer from this problem when the metric incorrectly indicates to the optimizer that image quality is improving. Similar problems occur in synthetic aperture radar (SAR) systems wherein the autofocus algorithms sometimes actu- ally degrade image quality rather than improve it when trying to focus only a small portion of the image (i.e., snippet).

What is needed is a new metric that can determine whether an autofocus algorithm has improved or degraded the quality of a SAS or SAR image.

SUMMARY

A summary of certain embodiments disclosed herein is set forth below. These aspects are presented merely to provide the reader with a summary of these certain embodiments and are not intended to limit the scope of this disclosure or the claimed subject matter. Indeed, this disclosure may encom- pass a variety of aspects that may not be set forth below.

Disclosed herein are embodiments of a deep learning- based computing system and method for determining whether an autofocus algorithm has improved the image quality of a sonar or radar image or if the autofocus algorithm has actually degraded the image quality. The deep learning-based system and method embody a trained deep convolutional neural network that is configured to process an image snippet pair that comprises a baseline or original image snippet and an autofocused version of the baseline or original image snippet. The autofocused version is produced by applying an autofocus algorithm to the baseline or original image snippet. The convolutional neural network processes the pair of image snippets to determine if the autofocus algorithm has improved or degraded the image quality of the baseline or original image snippet. The base- line or original image snippet may be the original, unfocused SAS or SAR image snippet, or it may be an image snippet that has already undergone an iteration of the autofocus algorithm. In the latter case, the autofocused version is the result of a successive iteration of the autofocus algorithm. The convolutional neural network outputs data that repre- sents a confidence of improvement in image quality. The convolutional neural network leverages self-supervised learning and requires significantly fewer ground truth labels than a fully-supervised convolutional neural network which would require labelling thousands of image pairs.

Embodiments of the present disclosure may be a com- puting system, a method, and/or a computer program prod- uct. The computer program product may include a non- transitory computer readable medium for storing thereon computer readable program instructions for causing a pro- cessor to carry out aspects of the present disclosure.

In some embodiments, the method comprises providing a deep convolutional neural network, training the deep con- volutional neural network to analyze a pair of images to determine which image has a better image quality, providing an unfocused image, performing an autofocus algorithm on the unfocused image to provide an autofocused image, inputting the unfocused image and the autofocused image into the trained deep convolutional neural network, analyz- ing, by the trained deep convolutional neural network, the unfocused image and the autofocused image to determine if the autofocus algorithm has enhanced or degraded the unfocused image, and outputting, by the trained deep con- volutional neural network, data indicating confidence that the autofocused image is of higher quality than that of the unfocused image.

In some embodiments, the computing system comprises an input for receiving a baseline image and an autofocused version of the baseline image produced by an autofocus algorithm, at least one processor operably connected to at least one memory, and a non-transitory computer readable medium. The non-transitory computer readable medium includes image processing software comprising a trained deep neural network that, when executed by the at least one processor, causes the at least one processor to perform operations comprising comparing, by the trained deep con- volutional neural network, the baseline image and the auto- focused version of the baseline image to determine if the autofocus algorithm has improved or degraded the image quality of the baseline image, and generating, by the trained deep convolutional neural network, data indicating confi- dence that the autofocused version of the baseline image is of higher quality than the baseline image.

In some embodiments, the method comprises providing a baseline image, providing an autofocused version of the baseline image, and inputting the baseline image and auto- focused version into a computing system. The computing system has at least one processor operably connected to at least one memory, and a non-transitory computer readable medium having image processing software that includes instructions comprising a trained deep convolutional neural network. The method further comprises processing, by the trained convolutional deep neural network, the baseline image and the autofocused version of the baseline image to determine if the autofocus version of the baseline image has a higher image quality than that of the baseline image, and generating, by the trained deep neural network, data indicating confidence that the autofocused version of the baseline image is of higher quality than the baseline image.

In some embodiments, the non-transitory computer-readable storage medium stores computer-executable instructions that, when executed by at least one processor of a computing system, cause the computing system to perform a method comprising receiving a baseline image and an autofocused version of the baseline image, inputting the baseline image and the autofocused version of the baseline image into a trained deep convolutional neural network, comparing, by the trained deep convolutional neural network, the baseline image and the autofocused version of the baseline image to determine if the autofocused version is of higher quality than the baseline image, and generating, by the deep convolutional neural network, data indicating confidence that the autofocused version is of higher quality than the baseline image.

In some embodiments, the present disclosure is directed to a system, comprising at least one processor connected to at least one memory, a non-transitory computer readable medium including instructions stored thereon that, when executed by the at least one processor, cause the at least one processor to train a deep convolutional neural network to analyze a pair of images to determine which image has a better image quality, receive an unfocused image, perform an autofocus algorithm on the unfocused image to provide an autofocused image, input the unfocused image and the autofocused image into the trained deep convolutional neural network, analyze, by the trained deep convolutional neural network, the unfocused image and the autofocused image to determine if the autofocus algorithm has enhanced or degraded the unfocused image, and output, by the trained deep convolutional neural network, data indicating confidence that the autofocused image is of higher quality than that of the unfocused image.

DETAILED DESCRIPTION

As used herein, the terms "comprise", "comprising", "comprises", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

Reference in the specification to "an exemplary embodiment", "one embodiment", "an embodiment" or "some embodiments", means that a particular feature, structure or characteristic described in connection with the embodiment is included in at least one embodiment of the present disclosure. The appearances of the phrases "an exemplary embodiment", "one embodiment", "embodiment" or "some embodiments" in various places in the specification are not necessarily all referring to the same embodiment.

As used herein, "SAS" is an abbreviation for "synthetic aperture sonar".

As used herein, "ATR" is an abbreviation for "automated target recognition".

As used herein, "SAR" is an abbreviation for "synthetic aperture radar".

As used herein, the term "image" shall refer to a SAS image or a SAR image;

As used herein, the term "snippet" shall refer to a portion of a SAS image or a SAR image;

As used herein, "PGA" is an abbreviation for "phase gradient autofocus", which is disclosed in U.S. Pat. No. 4,924,229, entitled "Phase Correction System For Automatic Focusing Of Synthetic Aperture Radar". U.S. Pat. No. 4,924,229 is hereby incorporated herein by reference.

Figure 1:
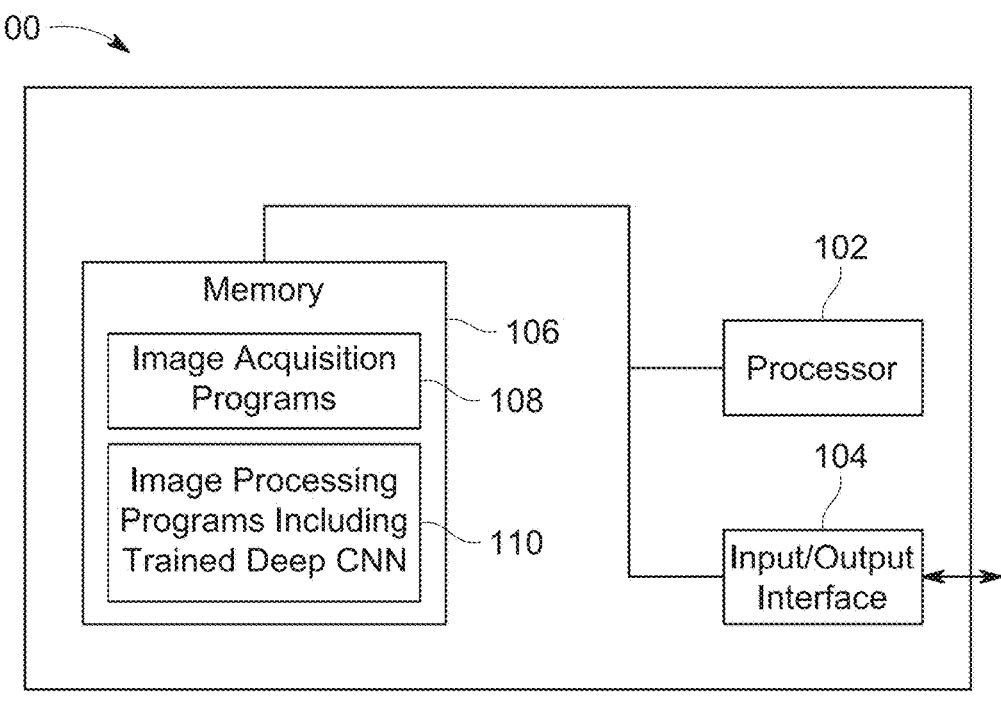
FIG. 1 is a block diagram illustrating a deep learning-based computing system in accordance with some embodiments.

Disclosed herein are embodiments of a deep learning-based computing system and method for determining whether an autofocus algorithm has improved the image quality of an image or if the autofocus algorithm has actually degraded the quality of the image. The image may be a SAS image or a SAR image. FIG. 1 illustrates deep learning-based computing system 100 in accordance with an exemplary embodiment of the present disclosure. Computing system 100 comprises at least one processor 102. Processor 102 may include, for example, a central processing unit (CPU) and/or a graphics processing unit (GPU). In one embodiment, processor 102 may be configured as one or more microprocessors, such as an Intel Core® processor. Computing system 100 includes input/output interface 104 which may include a display screen, an input device such as a keyboard, a standard wire interface and/or wireless interface. Computing system 100 further includes memory 106. Memory 106 stores program instructions that are executed by processor 102 in order to implement the functions of computing system 100. Memory 106 also stores data that is used and processed by processor 102 in order to implement the functions of computing system 100. Memory 106 may also store an operating system. Memory 106 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface. In some embodiments, memory 106 may be configured as a non-transitory computer readable storage medium, a computer system memory or a random-access memory, such as DRAM, DDR RAM, SRAM, SDRAM, EDO RAM, Rambus RAM and non-volatile memory.

Referring to FIG. 1, the contents of memory 106 include software programs and data for embodiments of the systems and methods disclosed herein. However, one of skill in the art would recognize that these software programs, along with the memory contents related to those software programs, may not be included on one system or device, but rather may be distributed among a plurality of systems or devices, based on well-known engineering considerations. The methods and systems disclosed herein may include any and all such arrangements. In the exemplary embodiment shown in FIG. 1, the memory contents of memory 106 includes image acquisition programs 108 that may include software to acquire images from SAS or SAR systems. In some embodiments, image acquisition programs 108 acquire these SAR or SAS images through input/output interface 104. Memory 106 further includes image processing programs 110 that include or incorporate a trained deep convolutional neural network (CNN) 120 (see FIG. 4) that is discussed in detail in the ensuing description.

In some embodiments, image processing programs 110 and the deep convolutional neural network 120 may be implemented using Python or TensorFlow although other software packages and platforms may be used. However, it is to be understood that image processing programs 110 and trained deep convolutional neural network 120 are not limited to a particular software platform or programming language and may be executed using any number of commercially available software languages or platforms.

Figure 2:
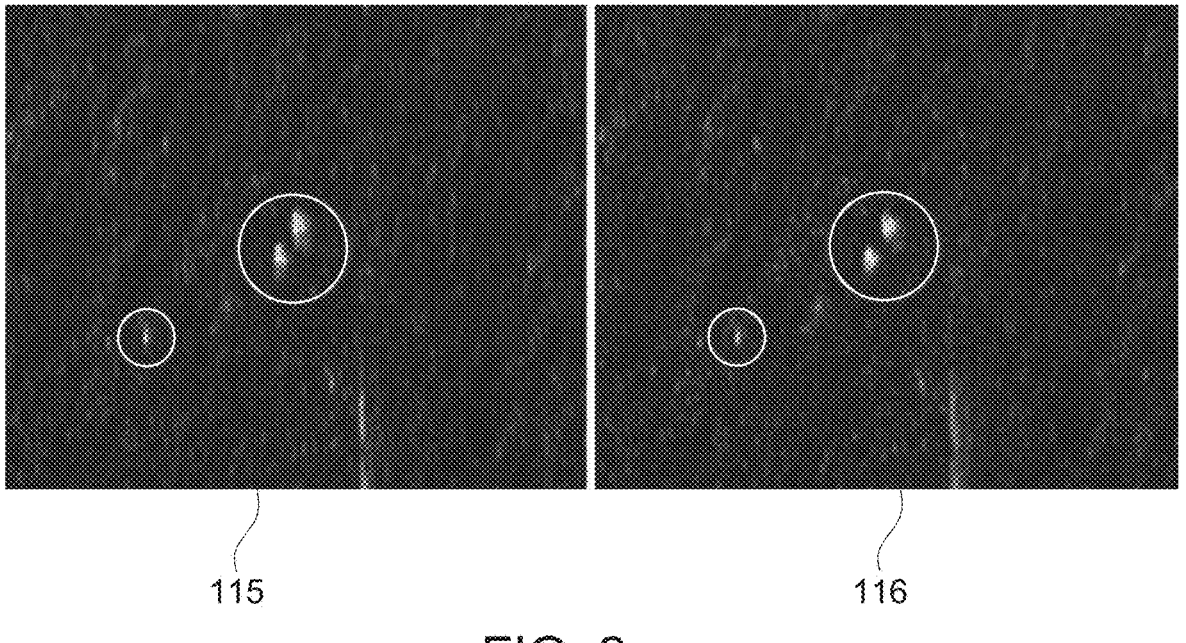
FIG. 2 illustrates a pair of unfocused and focused synthetic aperture sonar image snippets.
Figures 3, 4:
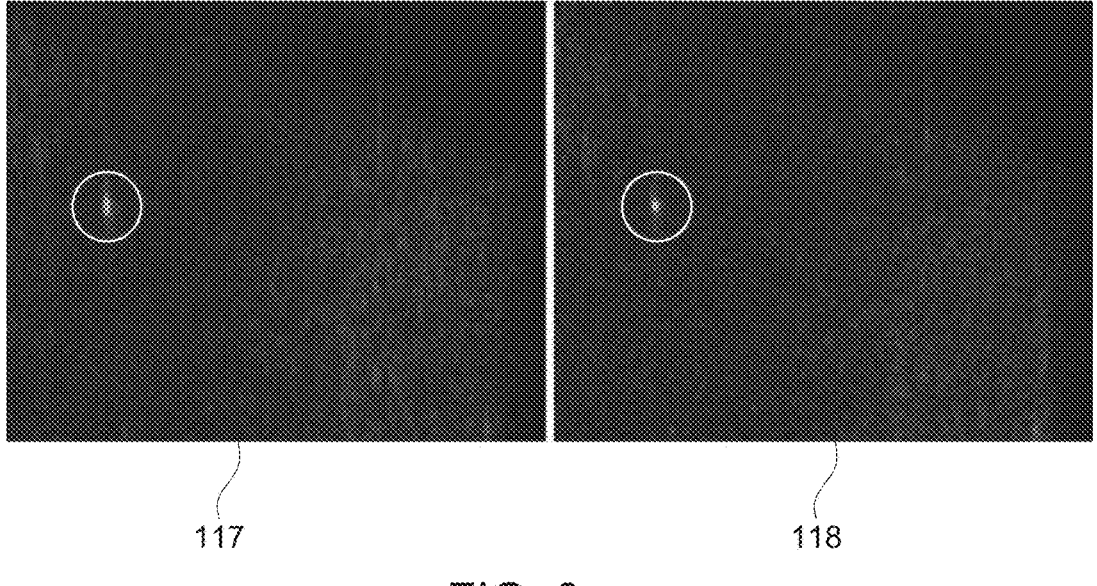
FIG. 3 illustrates another pair of unfocused and focused synthetic aperture sonar image snippets.
FIG. 4 is a block diagram of a trained deep convolutional neural network executed by the computing system of FIG. 1 in accordance with some embodiments.

In order to facilitate understanding of the embodiments of the present disclosure, examples of pairs of synthetic aperture sonar snippets are shown in FIGS. 2 and 3. FIG. 2 shows a pair of snippets consisting of unfocused snippet 115 and focused snippet 116, wherein the key differences in the snippets are encircled. Similarly, FIG. 3 shows a pair of snippets consisting of unfocused snippet 117 and focused snippet 118, wherein the key differences in the images are encircled. Focused snippets 116 and 118 are produced by an autofocus algorithm. Computing system 100 is configured to process such pairs of snippets to determine whether the autofocus algorithm has improved or degraded image quality. For example, computing system 100 will process snippets 115 and 116 to determine whether the autofocus algorithm has improved or degraded the image quality of unfocused snippet 115. Similarly, computing system 100 will process snippets 117 and 118 to determine whether the autofocus algorithm has improved or degraded the image quality of unfocused snippet 117.

FIG. 4 shows a block diagram of trained deep convolutional neural network 120 that is embedded within image processing programs 110 and executed by processor 102. For purposes of brevity, convolutional neural network (CNN) 120 is referred to herein as neural network 120. In order to facilitate understanding of the systems and methods of the present disclosure, the ensuing description is in terms of the SAS images or snippets being applied to and processed by neural network 120. However, it is to be understood that SAR images or snippets may also be applied to and processed by neural network 120 in the same manner. In an exemplary embodiment, neural network 120 is a ResNet-18 neural network, which is well-known in the art. The ResNet-18 neural network model that is shown in FIG. 4 is different than the originally published ResNet-18 neural network model in that the number of input channels has been decreased from three (RGB) inputs to a single, high frequency input 122. As discussed in the foregoing description, a pair of SAS snippets consisting of an unfocused snippet, indicated by reference number 130, and a focused snippet, indicated by reference number 132, are fed to neural network 120 via input 122. Neural network 120 has a relatively low parameter count and relatively fast training time thereby lowering the size, weight, and power (SWaP) constraints required for incorporating neural network 120 into an edge computing system. In order to further reduce the SWaP of neural network 120, the feature extraction components of neural network 120 (layers prior to the fully-connected layer) are separated from the classification components (fully-connected layer) in order to reuse the learnable feature extractor parameters for the paired SAS snippets fed to input 122. Without this separation, neural network 120 would have ≈22.5 million parameters, as opposed to ≈11.3 million parameters with a shared-weight feature extractor. During training of neural network 120, each snippet 130 and 132 is passed through feature extractor 140. Feature extractor 140 outputs two feature vectors 142 and 144 of length 512 which are fed to concatenation node 146. Concatenation node 146 concatenates feature vectors 142 and 144. The output 147 of concatenation node 146 is fed to classifier 148 which comprises a sequence of fully-connected layers, including activation and batch normalization. The nodes labelled as Batch Norm (i.e., batch normalization), Linear (1024→128), ReLU, Linear (128→1) and Sigmoid are all standard building blocks of neural networks and therefore, are not discussed in detail. Classifier 148 generates output 150 which comprises data (e.g., numerical value) that indicates the confidence that the image quality of second snippet 132 is of higher quality than the image quality of first snippet 130, evaluated on the basis of binary cross entropy. The process of training neural network 120 is described in detail in the ensuing description.

Training datasets are used to train neural network 120 for analyzing unfocused and autofocused SAS or SAR images. In one embodiment, neural network training software programs may be stored on memory 106 (see FIG. 1) and training datasets may be loaded into memory 106 via input/output interface 104. In such an embodiment, processor 102 executes the neural network training software programs. In another embodiment, the neural network training software programs and datasets are stored on the storage medium of a separate computing system (not shown). In such an embodiment, the processor (not shown) of the aforesaid separate computing system executes the neural network training software programs. Once neural network 120 is trained, the aforesaid separate computing system may then transfer the trained neural network 120 to memory 106 via input/output interface 104 so it may be incorporated with image processing programs 110.

Figure 5A:
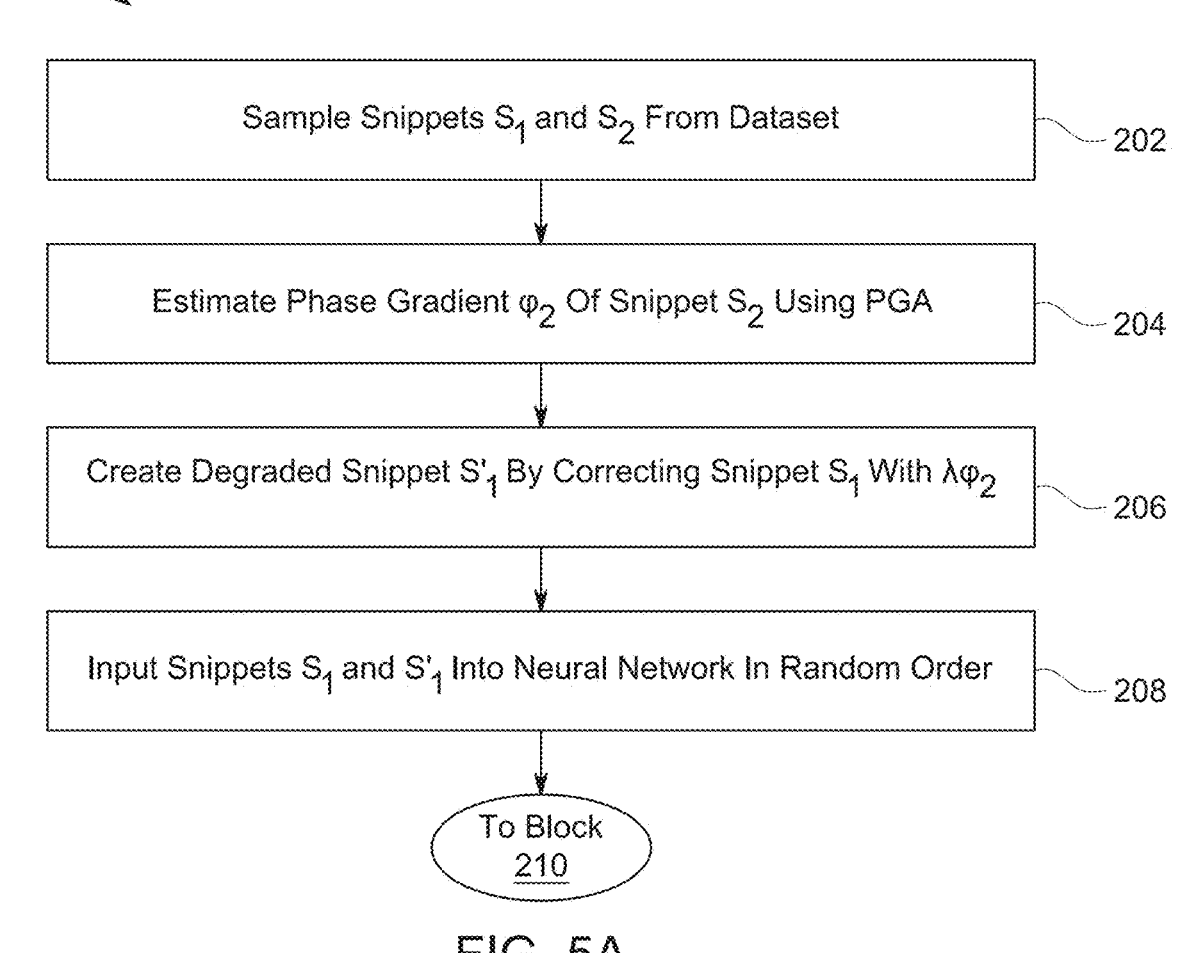
FIGS. 5A and 5B are flow diagrams of a process for training the deep convolutional neural network in accordance with some embodiments.
Figure 5B:
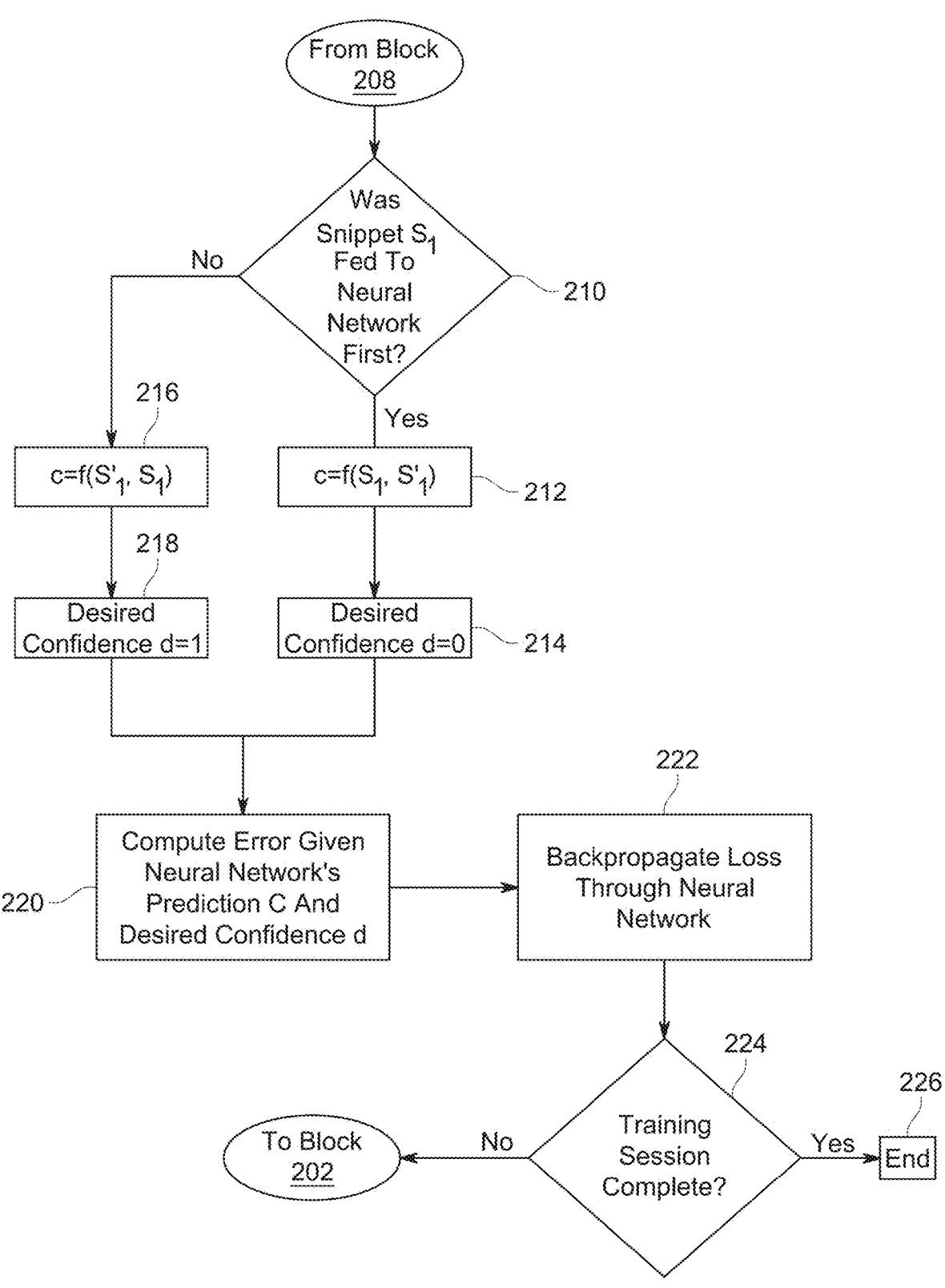

FIGS. 5A-5B are flow diagrams of method 200 for training neural network 120 in accordance with an embodiment of the present disclosure. Method 200 embodies a self-supervised paradigm so as to avoid a very time consuming and subjective labeling process. As indicated at block 202, the method may include sampling two SAS snippets $S_1$ and $S_2$ from a dataset. The dataset is composed of a large corpus of SAS snippets extracted from objects of interest detected by an ATR algorithm. The dataset is partitioned into training and validation as is commonly done in machine learning practice. The full images from which these snippets are extracted are collected in seven geographic regions, five of which are used during training and the other two only for validation. This dataset is referred to herein as the "ATR dataset". A small test dataset, composed of 577 real non-focused/focused PGA pairs manually sourced from geographic regions not seen during training, was constructed to verify that neural network model performance is as expected on new imagery. These snippets were carefully filtered from 1000 candidates to ensure that the focused snippet is of indisputably higher quality than the non-focused snippet. This smaller test dataset is referred to herein as the "PGA dataset". In order to avoid overfitting while evaluating robustness to particular train/test splits, four-fold cross validation is performed on the PGA dataset. In this scheme, the PGA dataset is divided into four equally-sized parts with each individual part used for testing a model trained on the other three. For each fold, 25% of the training set, which comprises 75% of the entire dataset, is used for validation. Thus, four different evaluation datasets are derived from the "PGA dataset".

Table I provides a concise breakdown of the datasets used in training, validation and testing, along with some key network hyperparameters.

TABLE I

| Dataset | Snippets | Purpose | Regions | Learning Rate | Batch Size |
|---------|----------|---------|---------|---------------|------------|
| ATR | ≈400,000 | Pretrain | 1-5 | $10^{-3}$ w/ Cosine | 48 |
|  | ≈50,000 | Validation | 1-5 | Annealing | 48 |
| PGA | ≈325 | Train | 6-7 | $10^{-4}$, Fixed | 16 |
|  | ≈108 | Validation | 6-7 |  | 16 |
|  | ≈144 | Test | 6-7 |  | 16 |
| Total | ≈450,000 |  | 1-7 |  |  |

Neural network 120 was trained on the ATR dataset using self-supervised learning for 50 epochs. As the full training dataset contains around 400,000 images, an epoch was defined as 100,000 randomly chosen samples from the full dataset. This was done to reduce overall time between epochs, since it has been found that it is unnecessary to iterate over the full training dataset for each epoch. Over the full training session, the number of times that each snippet in the full training dataset was shown to the neural network is equal in expectation (≈12.5 times). After pretraining, transfer learning was used to finetune the neural network on each fold of the four folds in the PGA dataset, producing four neural network models from the same pretrained weights. The weights from the pretrained neural network model are used as initialization for these experiments. Furthermore, a control experiment was performed on each fold of the PGA dataset which is identical to each finetuning experiment except (1) the initial neural network model weights are random instead of pretrained, and (2) the learning rate starts at $10^{-3}$ and decreases with cosine annealing, as the fixed $10^{-4}$ learning rate was not suitable for training from random weights on such a small dataset. In training all neural network models, the final set of weights chosen was that which yielded the lowest validation loss and the neural network models were trained for 50 epochs over their respective datasets.

As indicated at block 204, the method may include estimating the phase gradient $\varphi_2$ of snippet $S_2$ using the PGA methodology described in the aforementioned U.S. Pat. No. 4,924,229.

As indicated by block 206, the method may include creating a degraded snippet $$S_1'$$

by correcting snippet $S_1$ with realistic but intentionally incorrect phase gradient $\lambda\varphi_2$ according to equation (1)

$$S_1' = G\{F\{S_1\}\exp\{-j\varphi_2\}\}, \tag{1}$$

wherein F is the Fourier transform in the range dimension, G is the inverse of F and "j" represents the imaginary unit. This process is similar to PGA except in this case, the goal is to defocus a snippet rather than focus the snippet. The phase gradient that is used to defocus each image is multiplied by a decreasing scalar function of epoch t, according to equation (2)

$$\lambda(t) = \frac{1.8}{1 + e^{0.1t}} + 0.1 \tag{2}$$

Figure 6:
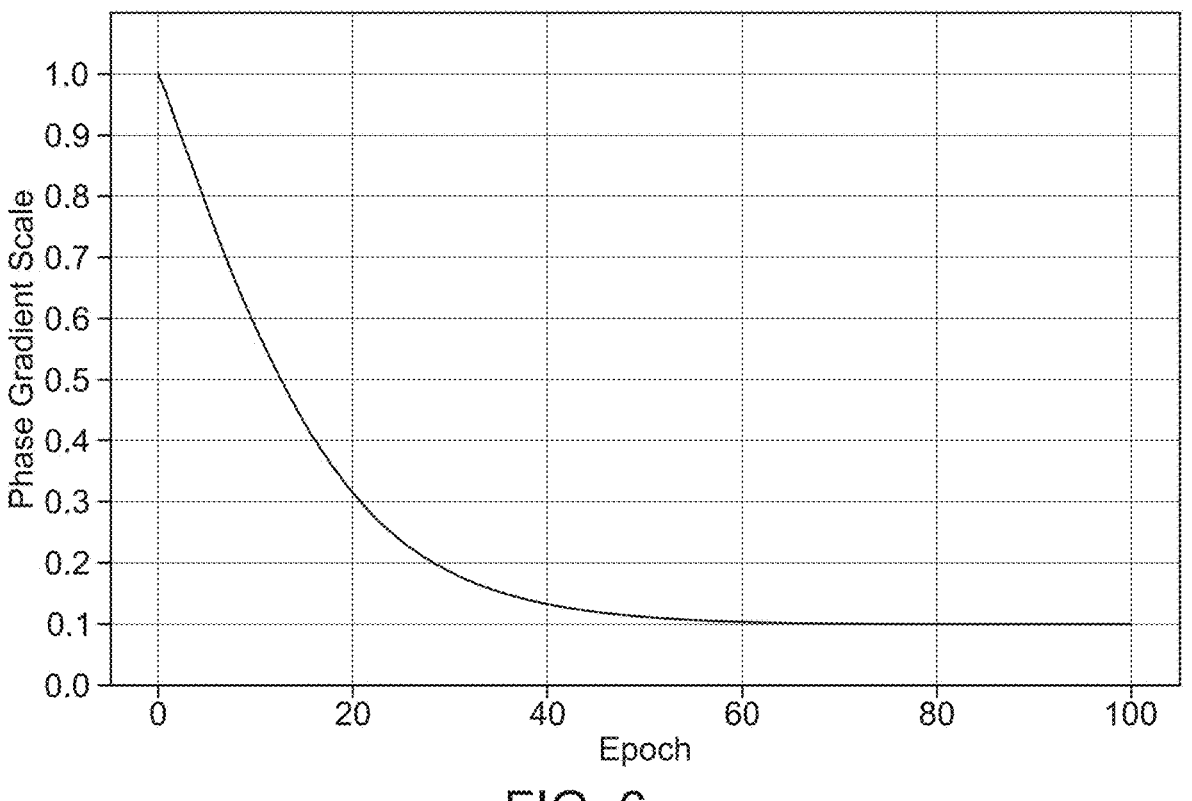
FIG. 6 shows phase gradient scale 2 plotted as a function of epoch t.

As shown in FIG. 6, $\lambda$ is plotted as a function of epoch t. At the first epoch, $\lambda(0)=1$ and the phase gradient of $S_2$ is being used directly. The function $\lambda$ is determined heuristically. Specifically, equation (2) was adjusted so that $\lambda(0)=1.0$ and $\lambda(\infty)=0.1$. Since $\lambda=1.0$ initially, the full phase error is applied to the snippet thereby making the neural network's task easier. As training progresses, $\lambda\rightarrow0.1$ which increases the difficulty of the neural network's task as it learns. If the value $\lambda$ becomes too small, the amount of phase error that is being applied to the snippet becomes so small that it is not reasonable to expect neural network 120 to detect it. Therefore, a value of 0.1 was selected as the asymptote as t→∞. Thus, as t→∞, $\lambda(t)\rightarrow0.1$ so that $S_1$ and $$S_1'$$

are different enough such that requiring the neural network model to distinguish between the two snippets $S_1$ and $S_1'$ is reasonable.

Method 200 continues at block 208 wherein both snippets $S_1$ and $S_1'$ are fed to input 122 of neural network 120 in random order so as to simulate two successive iterations of an autofocus algorithm. The sequence $(S_1', S_1)$ corresponds to an iteration of autofocus that improves the quality of a snippet since the defocused snippet is presented first. Conversely, the sequence $(S_1, S_1')$ corresponds to the case in which autofocus has lowered the image quality of a snippet. It is the object of neural network 120 to detect the latter case, in which the autofocus has lowered the image quality of the snippet. It has been found that using the phase gradient from other snippets instead of generating them according to some model is to ensure that defocused images $S_1'$ are plausible to occur in real data. Physical factors that induce quadratic phase error include uncompensated platform motion and error in sound-speed estimates. Such physical factors are easier to estimate from other real data instead of generating these physical factors stochastically.

Blocks 210, 212, 214, 216 and 218 determine which snippet was fed first to neural network 120, original snippet $S_1$ or degraded snippet $S_1'$, and then sets the desired confidence of neural network 120 to a value of "0" to indicate degradation in image quality (if original snippet $S_1$ was fed first to neural network 120, or to a value of "1" to indicate improvement in image quality (if the degraded snippet $$S_1'$$

was fed first to neural network 120). Blocks 210 through 218 may be represented by the following mathematical expressions:

If u<0.5, then

Let $c=f(S_1,S_1')$ and $d=0$

Else

Let $c=f(S_1',S_1)$ and $d=1$

End wherein:

"u" is a uniform random number between 0.0 and 1.0 and indicates the probability that defocused snippet $S_1'$ was fed first to neural network 120;

"c" is the actual confidence of neural network 120 that the image quality has been improved and is indicated by output 150 in FIG. 4;

"f" represents passing the two snippets $S_1$ and $S_1'$ through neural network 120; and "d" is the desired output (i.e., desired confidence) of neural network 120.

When the original snippet $S_1$ is fed first to neural network 120 and the degraded snippet $S_1'$ is fed subsequent to snippet $S_1$, then c=f $(S_1, S_1')$ and the desired confidence "d" is set to "0" so as to represent a degradation in image quality. When the degraded snippet $S_1'$ is fed first to neural network 120, c=f $(S_1', S_1)$ and "d" is set to "1" to indicate an improvement in image quality, with "c" being the actual confidence of neural network 120 that the image quality has been improved.

Method 200 continues at block 220 which computes the error given the neural network's prediction "c" and the desired confidence "d". This is represented by equation (3):

$$L=d\log c+(1-d)\log(1-c),\text{through } f. \qquad (3)$$

wherein the error function "L" is binary cross entropy and represents the backpropagation loss. Backpropagation essentially moves all of the weights in the neural network, by a small amount, in the direction of decreasing error. Method 200 continues at block 222 which backpropagates the loss (i.e., the computed error) through neural network 120. Method 200 continues at step 224 which determines if the training session is complete. If the training session is not complete, then method 200 returns to block 202 so that another pair of snippets may be retrieved from the dataset and processed accordingly. If the training session is complete, then method 200 ends at block 226.

Thus, during training of neural network 120, each of the two snippets $S_1$ and $$S_1'$$

is passed through feature extractor 140. Feature extractor 140 outputs two feature vectors 142 and 144 of length 512 which are fed to concatenation node 146. Concatenation node 146 concatenates feature vectors 142 and 144. The output 147 of concatenation node 146 is fed to classifier 148 which comprises a sequence of fully-connected layers, including activation and batch normalization. Classifier 148 generates output 150 which is the neural network model's confidence that the second snippet is of higher quality than the first snippet, evaluated on the basis of binary cross entropy.

Figure 7A:
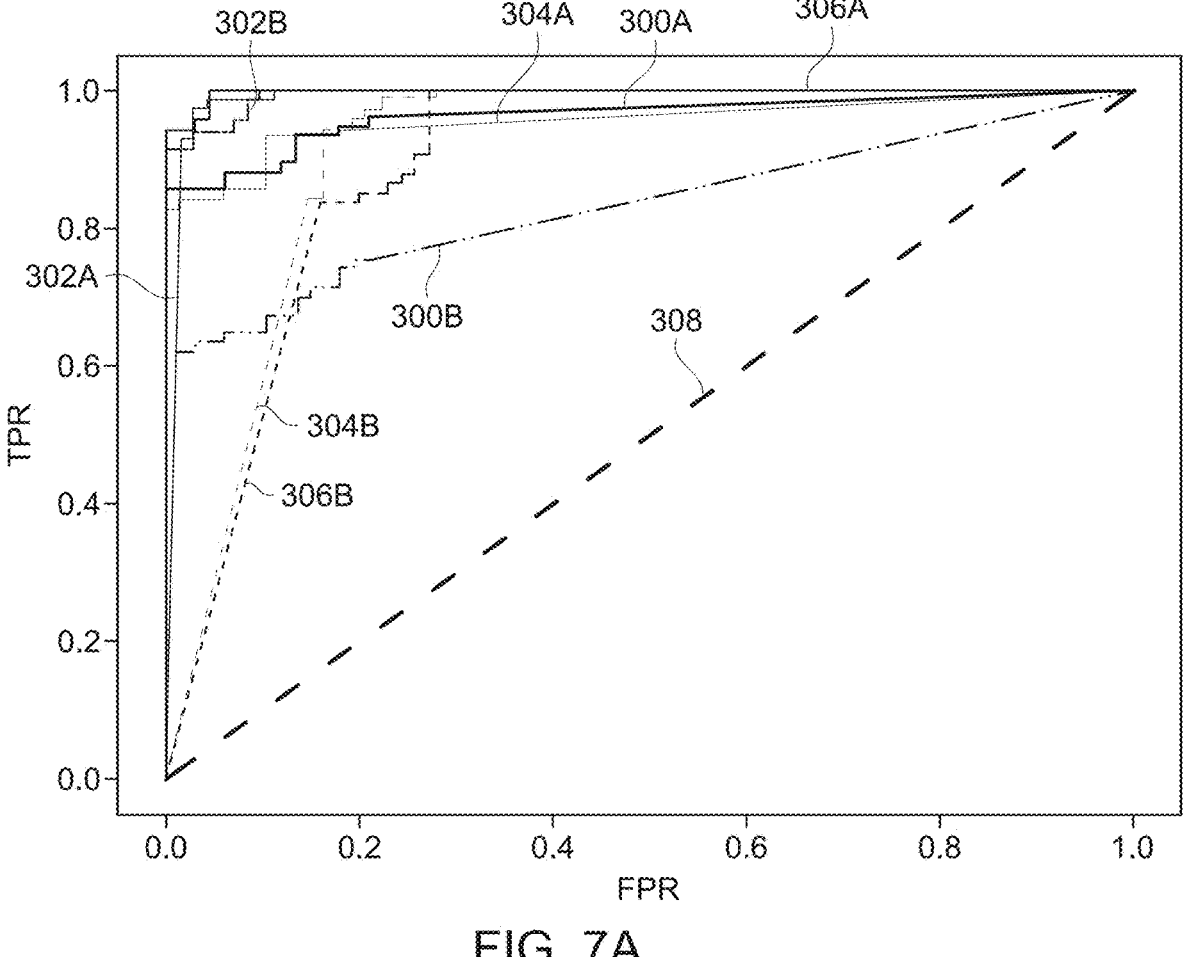
FIGS. 7A and 7B show receiver operating characteristics (ROC) curves for each of four self-supervised neural network models trained on a cross-validated phase gradient autofocus (PGA) dataset.
Figure 7B:
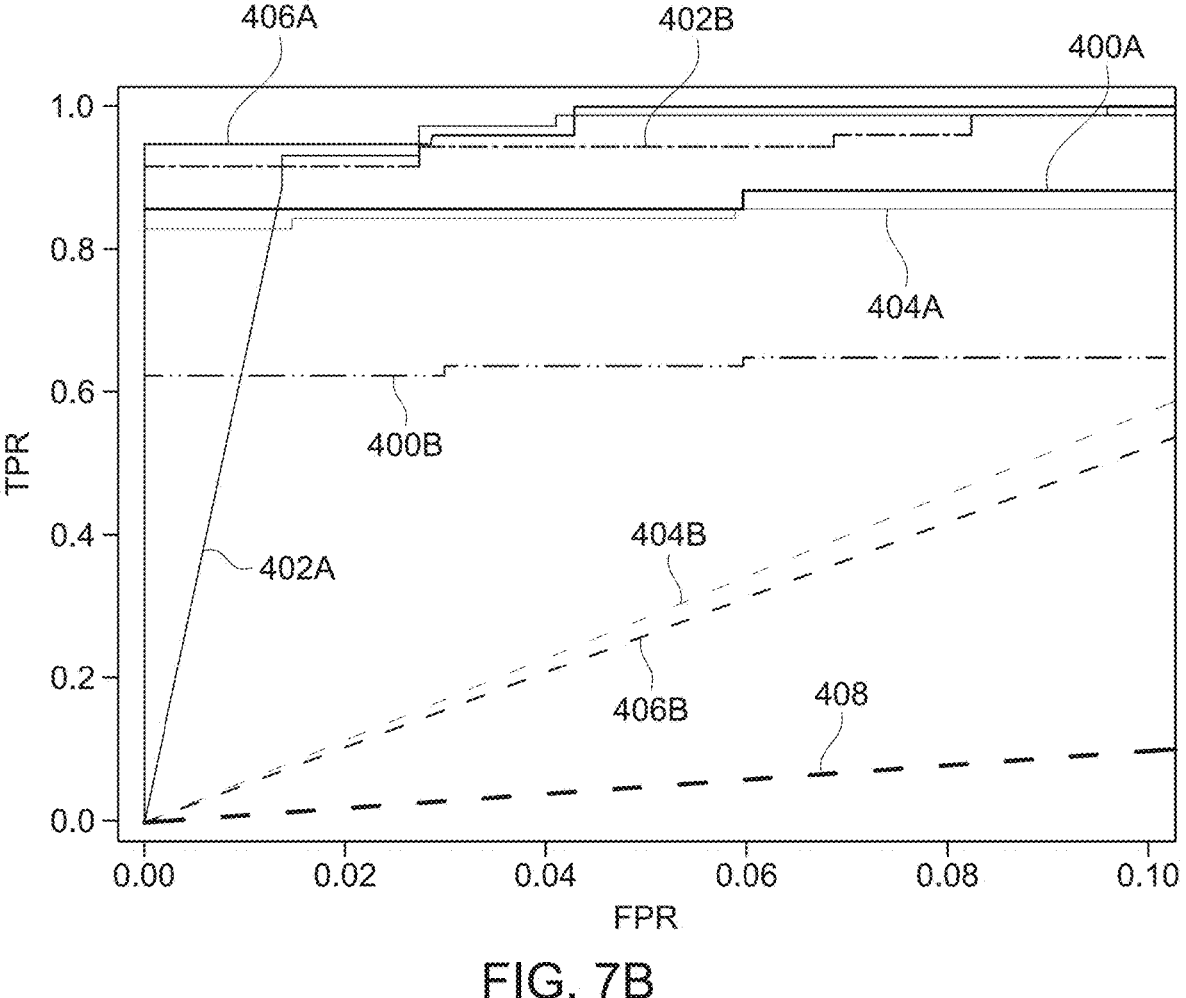

Testing and experimentation have shown that neural network 120 can successfully learn to discriminate between unfocused and focused SAS snippets and that self-supervised pretraining on synthetically defocused SAS snippets leads to better model generalization when finetuned on a small real dataset than training directly on the real dataset. In order to further validate the superiority of a self-supervised trained neural network model versus a fully supervised neural network model, testing was done on four self-supervised pre-trained neural network models and four fully supervised neural network models. Each neural network model is evaluated on the test dataset associated with its fold of the PGA dataset and receiver operating characteristic (ROC) curves are created. In general, when comparing the ROC curves of two models, the one with higher true positive rate (TPR, y-axis) at a fixed false positive rate (FPR, x-axis) is preferable at that FPR. ROC curves for each of the four self-supervised neural network models trained on the cross-validated PGA dataset are shown in FIGS. 7A and 7B. The curves for the self-supervised models are shown as solid lines and the curves for the fully supervised models are shown as dashed lines. There is a solid line and dashed line for each particular fold (Folds 1-4) in the four-fold cross validation scheme. FIG. 7A shows full ROC curves wherein FPR ranges from 0.0 to 1.0. Solid line 300A and dashed line 300B correspond to Fold 1. Solid line 302A and dashed line 302B correspond to Fold 2. Solid line 304A and dashed line 304B correspond to Fold 3. Solid line 306A and dashed line 306B correspond to Fold 4. All models perform substantially better than random weights (indicated by dashed line 308). FIG. 7B shows ROC curves for low FPR that ranges from 0.00 to 1.0. Solid line 400A and dashed line 400B correspond to Fold 1. Solid line 402A and dashed line 402B correspond to Fold 2. Solid line 404A and dashed line 404B correspond to Fold 3. Solid line 406A and dashed line 406B correspond to Fold 4. All models perform substantially better than random weights (indicated by dashed line 408). In almost all cases, especially at low FPR, the self-supervised models (solid lines) exhibited higher performance than fully-supervised models (dashed lines), attesting to the value of self-supervised pretraining. For a singular performance number across all FPRs, area under the ROC curve (AUC) is used, which can be interpreted as a measure of overall model quality. The AUC of each ROC curve of FIG. 7A is reported in Table II. On all folds, except Fold 2 in which AUC was almost equal, the pretrained weights led to substantially higher AUC in comparison to random weights.

TABLE II

| Fold | AUC Pretrain | AUC Supervised |
|---|---|---|
| 1 | 0.963 | 0.834 |
| 2 | 0.990 | 0.994 |
| 3 | 0.954 | 0.909 |

11

TABLE II-continued

| Fold | AUC Pretrain | AUC Supervised |
|------|--------------|----------------|
| 4 | 0.998 | 0.891 |
| Average | 0.976 | 0.907 |

The present disclosure provides a deep learning-based autofocus improvement metric that provides a confidence as to which of two snippet realizations is more focused. The neural network 120 leverages self-supervised learning. As a result, far fewer ground truth labels are required to train neural network 120 in comparison to fully supervised models. This is a significant advantage given the subjective and time-consuming nature of requiring an operator to label thousands of image pairs. Neural network 120 may be retrained using imagery from different SAS sensors. Neural network 120 was evaluated on a gold-standard dataset not used for training. It was determined that the confidences produced by this neural network model consistently agree with domain experts in deciding which of two images is better focused. The self-supervised neural network model 120 averaged above 0.97 AUC in a four-fold cross validation experiment on this dataset, a substantial improvement over the tested fully-supervised models which averaged around 0.91 AUC. Neural network model 120 may be configured to have a reduced size, weight, and power (SWaP) footprint so as to enhance its suitability for deployment to embedded autonomous underwater vehicle (AUV) platforms. In some embodiments, neural network model 120 is integrated directly into the autofocus process in order to transparently collect higher quality images.

Although the foregoing description is in terms of computing system 100 incorporating a convolutional neural network for analyzing pairs of snippets, it is to be understood that alternate models, networks, platforms and architecture may be used to analyze the pairs of snippets. Examples include, but are not limited to, Vision Transformers (ViT), feature-based architecture such as histogram of oriented gradients (HOG), or local binary patterns (LBP) to extract features supplemented by classifiers such as support vector machines (SVMs) or multilayer perceptrons (MLPs). Thus, any of the aforesaid alternate models, networks, platforms and architecture may be used in place of the convolutional neural network.

The foregoing description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method of establishing an image quality metric for an autofocused synthetic aperture image comprising the steps of:

receiving a synthetic aperture image and retaining said synthetic aperture image in processor memory;

autofocusing said received synthetic aperture image into an autofocused image and retaining said autofocused image in processor memory;

extracting features from said synthetic aperture image utilizing a feature extractor to provide an original feature vector;

extracting features from said autofocused image utilizing the same feature extractor to provide an autofocused feature vector;

concatenating the original feature vector and the autofocused feature vector to provide a concatenated feature vector;

conducting a batch normalization of the concatenated feature vector in a neural network resulting in a normalized feature vector;

reducing the number of elements in the normalized feature vector weighing the importance of different features utilizing a first linear neural network feature reduction function to provide a reduced feature vector;

applying a rectified linear unit activation function to the reduced feature vector to provide an adapted reduced feature vector; and reducing the number of elements in the adapted reduced feature vector utilizing a second linear neural network feature reduction function to provide a single image quality metric indicative of the confidence that the autofocused image is of higher image quality than the image quality of the synthetic aperture image.

2. The method of claim 1 wherein said step of reducing the number of elements in the adapted reduced feature vector further comprises reducing the number of elements in the adapted reduced feature vector to a single element and performing a sigmoid function on the single element to give the single image quality metric.

3. The method of claim 2 wherein the synthetic aperture image is a synthetic aperture sonar image.

4. The method of claim 2 wherein the synthetic aperture image is a synthetic aperture radar image.

5. The method of claim 1 wherein the neural network is a ResNet-18 neural network with the three inputs input channels decreased to one high frequency input for receiving the concatenated feature vector.

* * * * *